US012379071B2

(12) United States Patent
Sanchez et al.

(10) Patent No.: US 12,379,071 B2
(45) Date of Patent: Aug. 5, 2025

(54) DEWAR DRYING DEVICE

(71) Applicant: CRYOPORT, INC., Brentwood, TN (US)

(72) Inventors: Eden Sanchez, Bellflower, CA (US); Bret Bollinger, Yorba Linda, CA (US); Ben Lee, Corona, CA (US)

(73) Assignee: Cryoport, Inc., Irvine, CA (US)

( * ) Notice: Subject to any disclaimer, the term of this patent is extended or adjusted under 35 U.S.C. 154(b) by 315 days.

(21) Appl. No.: 16/936,099

(22) Filed: Jul. 22, 2020

(65) Prior Publication Data

US 2022/0026027 A1 Jan. 27, 2022

(51) Int. Cl.
*F17C 7/02* (2006.01)
*F17C 13/00* (2006.01)

(52) U.S. Cl.
CPC .............. *F17C 7/02* (2013.01); *F17C 13/006* (2013.01); *F17C 2205/0311* (2013.01); *F17C 2221/014* (2013.01); *F17C 2227/0304* (2013.01); *F17C 2250/0439* (2013.01); *F17C 2250/0473* (2013.01)

(58) Field of Classification Search
CPC . A01N 1/00; F17C 7/02; F17C 13/006; F17C 2250/032; F17C 2250/0631; F17C 2250/0439; F17C 2250/0473; F17C 2227/0304; F17C 2270/0509
See application file for complete search history.

(56) References Cited

U.S. PATENT DOCUMENTS

2005/0016198 A1 1/2005 Wowk et al.
2011/0308103 A1* 12/2011 Bellinger ................ D06F 58/38 34/497
2015/0377513 A1* 12/2015 Hammer ................. F24H 1/121 392/488
2019/0150427 A1 5/2019 McCormick
2019/0204283 A1* 7/2019 Lemkin ................ G01N 33/004
2020/0027610 A1* 1/2020 Singh ........................ G21F 5/06
(Continued)

FOREIGN PATENT DOCUMENTS

CN 1077012 A 10/1993
CN 106102460 A 11/2016
CN 205991691 U 3/2017
(Continued)

OTHER PUBLICATIONS

PCT; International Search Report & Written Opinion dated Nov. 2, 2021 in Application No. PCT/US2021/042408.
(Continued)

*Primary Examiner* — Frantz F Jules
*Assistant Examiner* — Webeshet Mengesha
(74) *Attorney, Agent, or Firm* — Snell & Wilmer L.L.P.

(57) ABSTRACT

Method, system, apparatus, and/or device for drying a dewar. The dewar drying apparatus includes a heating element. The heating element is configured to produce heat that warms a payload area within the dewar. The dewar drying apparatus includes a controller. The controller is coupled to the heating element and configured to determine or detect a temperature within the payload area of the dewar. The controller is configured to control, using the heating element, the temperature within the payload area of the dewar to evaporate a liquid or a gas within the payload area.

15 Claims, 7 Drawing Sheets

(56) References Cited

U.S. PATENT DOCUMENTS

| | | | | |
|---|---|---|---|---|
| 2020/0085036 | A1 * | 3/2020 | Creasey | F25B 9/14 |
| 2020/0224825 | A1 * | 7/2020 | Winand | F17C 13/084 |

FOREIGN PATENT DOCUMENTS

| | | | |
|---|---|---|---|
| CN | 207815844 | U | 9/2018 |
| CN | 208419390 | U | 1/2019 |
| CN | 209744900 | U | 12/2019 |
| CN | 209763627 | U | 12/2019 |
| CN | 210036202 | U | 2/2020 |
| JP | S53163185 | U | 12/1978 |
| JP | H10296161 | A | 11/1998 |
| JP | 2003148698 | A | 5/2003 |
| JP | 2008-183422 | A | 8/2008 |
| JP | 5916517 | B2 * | 5/2016 |
| RU | 2059171 | C1 | 4/1996 |
| WO | 20190218143 | A1 | 11/2019 |

OTHER PUBLICATIONS

PCT; International Preliminary Report on Patentability (IPRP) dated Feb. 2, 2023 in Application No. PCT/US2021/042408.

IPO: Examination Report dated Sep. 18, 2023 for Application No. GB2300817.0.

UK: Intent to Grant dated Jan. 4, 2024 in Application No. GB2300817.0.

EP: Extended Search Report dated May 29, 2024 in Application No. 21846562.3.

CN; 1st Office Action dated Apr. 1, 2025 in Application Serial No. 202180059402.7.

JPO; 1st Office Action dated May 29, 2025 in Application Serial No. 2023-504241.

* cited by examiner

DEWAR DRYING DEVICE

BACKGROUND

1. Field

This invention relates to a system, device or apparatus for a dewar drying device that dries a dry vapor shipper.

2. Description of the Related Art

In the shipping business, certain types of contents and cargo require extra special care. This need is apparent when shipping biological samples and specimens. Businesses, hospitals, labs and other research or consumer facilities need to ship biological material that is highly susceptible to cellular degradation if not kept at a certain temperature and require cryogenic shipping services to ship biological material at cryogenic temperatures (approximately −150 degrees Celsius). The shipping of these temperature controlled materials requires special equipment, such as a dry vapor shipper that is validated to maintain the cryogenic temperature for an extended period to prevent or avoid cell degradation or loss. For example, a dry vapor shipper is a metallic flask that has a payload area or well that holds the biological material within at cryogenic temperatures for a long period of time to allow the transport of the biological material.

When the dry vapor shipper is returned, the dry vapor shipper's functionality must be verified and must be cleaned prior to shipment of the next payload to reduce the likelihood of cross contamination. The standard procedure requires that all the liquid nitrogen (LN2) to be removed from inside the dry vapor shipper so that the dry vapor shipper returns to ambient temperature, which allows the dry vapor shipper to be cleaned. This is challenging because the dry vapor shipper utilizes an effective absorbent material that holds the dry vapor shipper at the cryogenic temperature for longer than ten days. Current methods involve inverting the dry vapor shipper for a minimum of 24 hours, which ensures that the LN2 inside the dry vapor shipper is shifted to the dry vapor shipper's opening and increases the LN2's evaporation rate. This, however, extends the dry vapor shipper's processing time and reduces the dry vapor shipper's availability.

Moreover, when the dry vapor shipper is inverted to remove the liquid nitrogen, this may cause moisture to accumulate within the absorbent material within the payload area of the dry vapor shipper. This buildup of moisture inside the absorbent material is harmful to the effectiveness of the absorbent material. And as a result, the amount of liquid nitrogen that may be maintained within the absorbent material is reduced, which reduces the holding time.

Accordingly, there is a need for a method, system, device or apparatus to increase the LN2 evaporation rate from the dry vapor shipper, reduce an amount of moisture that is retained in the absorbent material, improve the dry vapor shipper's availability and ensure that all the LN2 inside the dry vapor shipper has evaporated.

SUMMARY

In general, one aspect of the subject matter described in this specification is embodied in a dewar drying apparatus for a dewar. The dewar drying apparatus includes a heating element. The heating element is configured to produce heat that warms a payload area within the dewar. The dewar drying apparatus includes a controller. The controller is coupled to the heating element and configured to determine or detect a temperature within the payload area of the dewar. The controller is configured to control, using the heating element, the temperature within the payload area of the dewar to evaporate a liquid or a gas within the payload area without causing damage to any materials in the payload area.

These and other embodiments may optionally include one or more of the following features. The controller may be configured to activate the heating element and increase, using the heating element, the temperature within the payload area of the dewar to evaporate the liquid or the gas. The controller may be configured to deactivate the heating element when the temperature within the payload area of the dewar is greater than or equal to a second threshold temperature. The controller may be configured to measure an amount of time for the temperature to decrease from the second threshold to the first threshold. The controller may be configured to determine that the payload area within the dewar is dry when the amount of time is greater than a threshold amount.

The dewar drying apparatus may include a housing. The housing may enclose the controller and an indicator. The indicator may be configured to visually indicate when the payload area within the dewar is dry. The controller may be configured to activate the indicator to visually indicate that the payload area is dry.

The dewar drying apparatus may include a dewar cover. The dewar cover may be positioned at a bottom of the housing and may be configured to be positioned on top of an opening of a neck of a dewar. The dewar drying apparatus may include an elongate member. The elongate member may be coupled to the housing at a proximal end and the heating element at a distal end. The elongate member may have a hollow tubular structure. The hollow tubular structure may surround one or more wires that deliver electrical energy from a power source to the heating element. The distal end of the elongate member may be positioned within the payload area of the dewar so that the heating element extends into the payload area.

The dewar drying apparatus may include a thermocouple device. The thermocouple device may be configured to measure the temperature within the payload area of the dewar. The controller may be coupled to the thermocouple device. The controller may be configured to determine or detect the temperature within the payload area of the dewar using the thermocouple device.

In another aspect, the subject matter is embodied in a dewar drying system. The dewar drying system includes a first dewar having a first payload area and a second dewar having a second payload area. The dewar drying system includes a first dewar drying device having a first heating element. The first heating element is configured to produce heat that warms the first payload area of the first dewar. The dewar drying system includes a second dewar drying device having a second heating element. The second heating element is configured to produce heat that warms the second payload area of the second dewar. The dewar drying system includes a controller. The controller is coupled to the first dewar drying device and the second dewar drying device. The controller is configured to control, using the first heating element, a first temperature within the first payload area. The controller is configured to control, using the second heating element, a second temperature within the second payload area. This configuration may be multiplied extending the capability to several dewars at the same time.

In another aspect, the subject matter is embodied in a method of drying a dewar. The method includes determining or detecting, by a processor and using sensor, a temperature within a payload area of the dewar. The method includes determining, by the processor, that the temperature within the payload area of the dewar is less than or equal to a first threshold. The method includes delivering, by the processor using a power source, electrical energy to a heating element to increase the temperature within the payload area. The method includes providing, by the processor using an indicator, an indication to a user that the dewar is dry.

In another aspect, the subject matter is embodied in a dewar drying system. The dewar drying system includes a dewar having a payload area configured to hold a liquid or a gas below an ambient temperature. The dewar drying system includes a dewar drying device. The dewar drying device includes a heating element that is configured to produce heat that warms a payload area within the dewar. The dewar drying device includes a sensor configured to detect a temperature within the payload area. The dewar drying device includes a controller. The controller is coupled to the sensor and the heating element. The controller is configured to determine or detect, using the sensor, the temperature within the payload area of the dewar and increase, using the heating element, the temperature within the payload area.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are systems, apparatuses and devices for a dewar drying apparatus. The dewar drying apparatus uses a controlled heat source positioned within the dewar to increase the evaporation rate of the liquid nitrogen (LN2) or other liquid or gas within a dewar or other dry vapor shipper. The dewar drying apparatus ensures that all the liquid or gas within the payload area of the dewar is removed prior to the next shipment so that there is no cross-contamination. Moreover, by using a heating source to evaporate the liquid or the gas, such as the LN2, the dewar drying apparatus reduces the amount of time to evaporate and dry the dewar in comparison to conventional standard procedures of inverting the dewar to remove the liquid or the gas content within the dewar. In fact, the use of the heating source to evaporate the liquid or the gas reduces the amount of evaporation time from approximately a full day (or 24 hours) to approximately less than 8 hours. This increases the processing time and increases the dewar's availability.

Other benefits and advantages of using a heating source to evaporate the liquid or the gas include allowing the dewar to remain covered and upright while the dewar drying apparatus evaporates the liquid or the gas. By maintaining the dewar upright and covered, the dewar drying apparatus prevents foreign objects from contaminating the payload area within the dewar. Additionally, since the dewar is not inverted, fewer drying racks are needed, which decreases the amount of space necessary to dry the dewars. Moreover, operators that are drying the dewars do not need to lift and invert the dewar onto the drying racks, which increases safety and minimizes hazards.

Additionally, since the dewar may remain upright, ambient air is not drawn into the inside of the dewar, which may cause frost, condensation, humidity or other water vapor to enter the dewar and become absorbed within the absorbent material, which prevents the absorbent material from absorbing LN2. If the absorbent material absorbs the water vapor, the voids and capillaries of the absorbent material hold the water vapor and expand, which causes the absorbent material to lose its capability to absorb and retain the LN2. As such, by keeping the dewar upright, the absorbent material does not expand due to absorption of the water vapor, which allows the absorbent material to later absorb more LN2 and maintain the overall cryogenic holding time of the dewar.

Figure 1A:
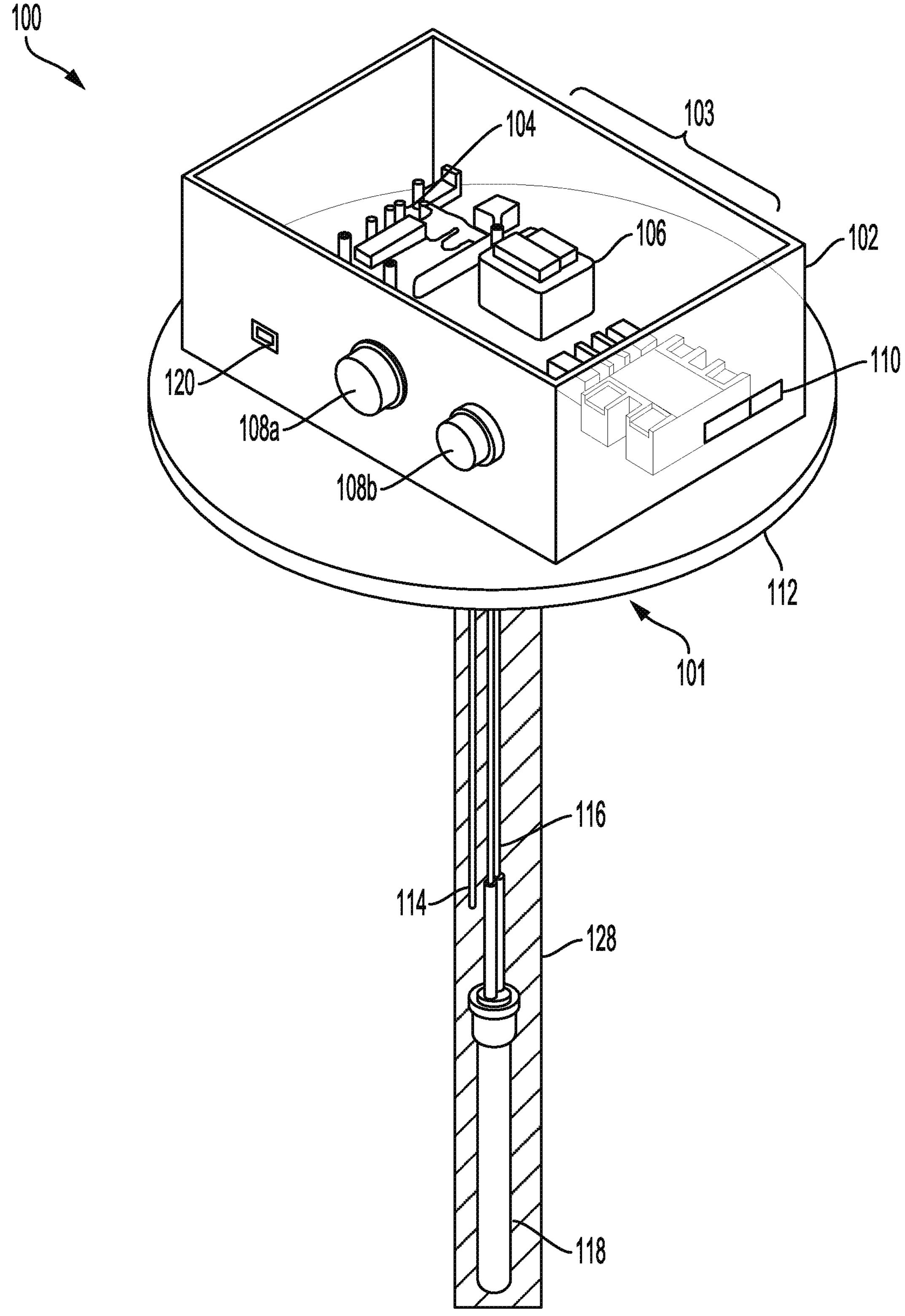
FIG. 1A shows an example of a dewar drying apparatus according to an aspect of the invention.

FIG. 1A shows a dewar drying apparatus (or "drying apparatus") 100. The drying apparatus 100 includes a drying platform 101 and processing circuitry 103. The drying apparatus 100 may include a housing 102 to enclose the processing circuitry 103 and protect the processing circuitry from the environment. The housing 102 may be positioned on the top of the dewar cover 112 of the drying platform 101. The drying apparatus 100 may be used to evaporate any liquid or gas, such as liquid nitrogen (LN2), that remains in a dry vapor shipper (or "shipper"), such as a dewar, when the dry vapor shipper is returned to the sender to be cleaned, sanitized and/or otherwise prepared for a subsequent shipment.

Figure 1B:
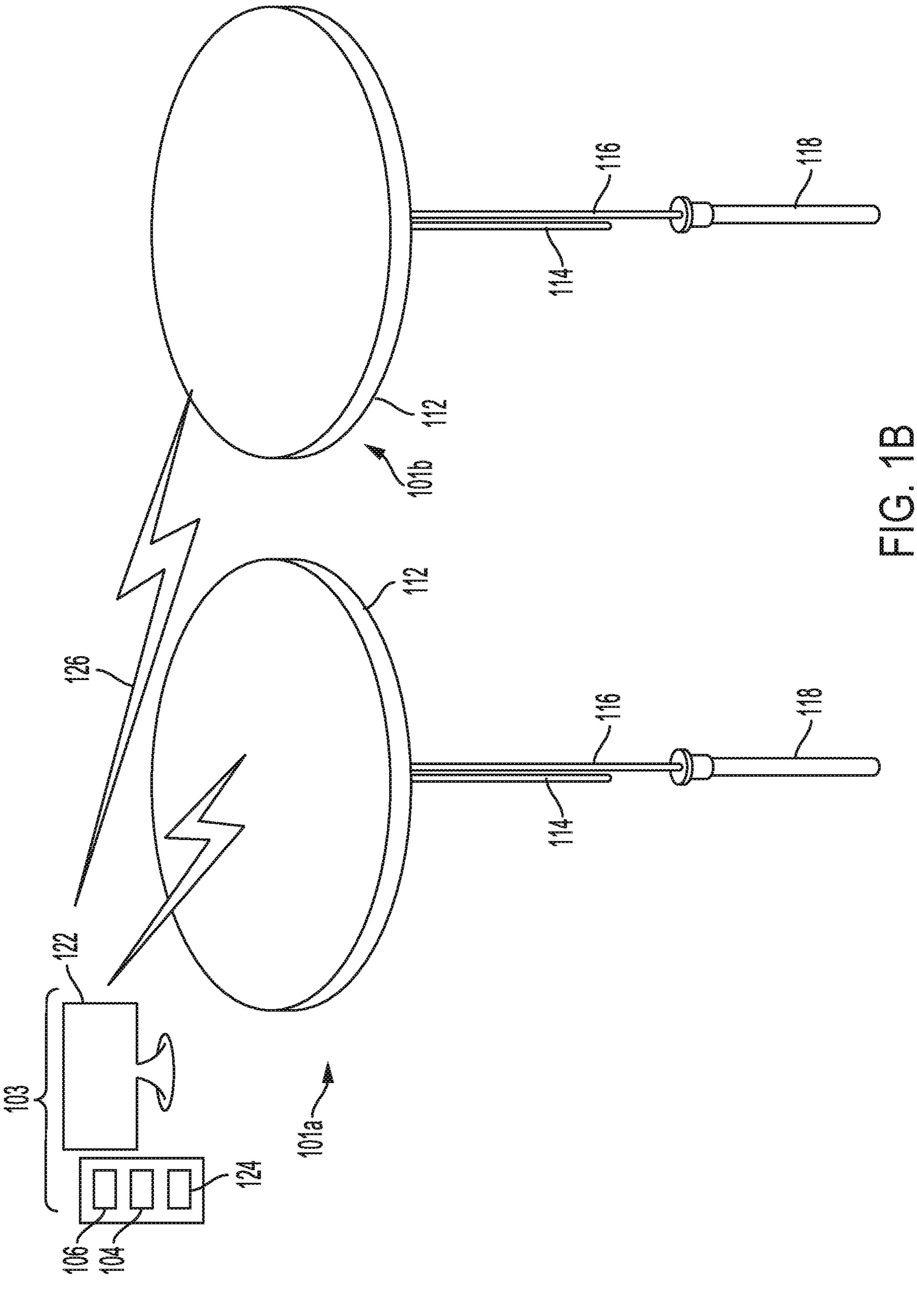
FIG. 1B shows another example of a dewar drying apparatus according to an aspect of the invention.

The drying apparatus 100 may include one or more drying platforms 101. For example, the drying apparatus 100 may include a single drying platform 101, as shown in FIG. 1A, or may include multiple drying platforms 101, such as a first drying platform 101*a* and a second drying platform, as shown in FIG. 1B. The multiple drying platforms 101 may include any number of drying platforms, e.g., 20 drying platforms. Each of the one or more drying platforms 101 may be coupled to a corresponding processing circuitry 103 or all the one or more drying platforms 101 may be coupled a single processing circuitry 103. The drying apparatus 100 may include any number of drying platforms 101 linked to a centralized processing circuitry 103. The one or more drying platforms 101 may be coupled via a wired or a wireless connection.

The drying apparatus 100 includes a processing circuitry 103. The processing circuitry 103 may be housed within the housing 102, which protects the processing circuitry 103 from the environment. The housing 102 may be coupled to the drying platform 101 or separate from and coupled to one or more drying platforms 101.

The processing circuitry 103 may include multiple components, such a processor 104, a memory 106 and/or adjustable circuitry. When the processing circuitry 103 is separate from and coupled to the one or more drying platforms 101, the processing circuitry 103 may include a network access device 124, as shown in FIG. 1B for example. The processing circuitry 103 may include circuitry for one or more indicators 108*a-b*, the switch 120 and/or a user interface 122.

The processor 104 may be implemented as a single processor or as multiple processors. The processor 104 may be a microprocessor, data processor, microcontroller or other controller, and may be electrically coupled to some or all the other components within the processing circuitry 103. The processor 104 may control the one or more indicators 108*a-b*, the switch 120 and/or one or more sensors 114.

The processor 104 may also control the delivery of the electrical energy from the power source 110 to the heating element 118. For example, the processor 104 may control an amount of electrical energy delivered from the power source 110 to the heating element 118, activation or de-activation of the delivery of the electrical energy and/or a frequency of delivery of the electrical energy. The amount of electrical energy that is delivered may be approximately 500 W for each of the one or more drying platforms 101 and may be different amounts for each of the one more drying platforms 101. For example, the processor 104 may deliver a first amount of electrical energy to the first drying platform 101*a* and a second amount to the second drying platform 101*b*. The processor 104 may deliver the electrical energy simultaneously, concurrently or sequentially to the one or more drying platforms 101. The drying apparatus 100 may rotate or cycle delivery of electrical energy among the one or more drying platforms 101 so that the electrical load on the power source 110 is maintained and not increased during delivery of the electrical energy to the one or more drying platforms 101. The processor 104 may be coupled to the memory 106.

The memory 106 may be coupled to the processor 104 and store instructions that the processor 104 executes. The memory 106 may include one or more of a Random Access Memory (RAM), Read Only Memory (ROM), USB storage device or other volatile or non-volatile memory. The memory 106 may be a non-transitory memory or a data storage device, such as a hard disk drive, a solid-state disk drive, a hybrid disk drive, or other appropriate data storage, and may further store machine-readable instructions, which may be loaded and executed by the processor 104.

The network access device 124 may include a communication port or channel, such as one or more of a Dedicated Short-Range Communication (DSRC) unit, a Wi-Fi unit, a Bluetooth® unit, a radio frequency identification (RFID) tag or reader, or a cellular network unit for accessing a cellular network (such as 3G, 4G or 5G). The network access device 124 may transmit data to and receive data between the processing circuitry 103 and one or more drying platforms 101. For example, the drying platform 101*a* and the drying platform 101*b* may communicate and transmit temperature data to the processing circuitry 103 via the network 126 and the network access device 124, and in response, the processing circuitry 103 may control an amount of electrical energy that is delivered to each of the drying platform 101*a* and/or the drying platform 101*b*.

The network access device 124 may transmit the data to and receive data from the one or more drying platforms 101 and the processing circuitry 103 via a network 126. The network 126 may be used to communicate among the different components, such as among the one or more drying platforms 101 and the processing circuitry 103. The network 126 may a wired or a wireless connection and may be a Dedicated Short-Range Communication (DSRC) network, a local area network (LAN), a wide area network (WAN), a cellular network, the Internet, or combination thereof, that connects, couples and/or otherwise communicates among the different components of the drying apparatus 100.

All these components may be located in a separate control box which will also incorporate a PLC (Programmable Logic Controller) that may control multiple heating elements. It may also store data from the heating process and be able to control the individual heating elements. This data may be used to increase the efficiency of the system there by reducing the drying process.

The drying apparatus 100 may include or be coupled to a user interface 122. The user interface 122 may include an input/output device that receives user input from a user interface element, a button, a dial, a microphone, a keyboard, a switch, such as the switch 120, or a touch screen. The user interface 122 may provide an output to an output device, such as a display, a speaker, an indicator, such as the one or more indicators 108*a-b*, which may be an audio and/or visual indicator, a refreshable braille display or other human machine interface (HMI). The user interface 122 may obtain one or more heater settings or recipes that may be used by the controller to control the heating element to increase or decrease the temperature within the payload area.

The user interface 122 may display sensor data, such as the temperature or humidity, within the payload area of the shipper. The user interface 122 may display other data, such as the amount of electrical energy that is being delivered or a frequency of the electrical energy that is being delivered within each of the one or more shippers. The user input may cause the processing circuitry 103 to activate and deliver electrical energy to the heating element 118.

The user interface 122 may provide notifications to the user or other operator, such as an indication that the shipper is dry. The user interface 122 may display statistics calculated from the sensor data, such as an estimated amount of time until the dry vapor shipper is dry and/or other statistics related to the evaporation of the LN2 within the payload area. The user interface 122 may also display alerts, such as the need to shut-off the delivery of the electrical energy.

Figure 3A:
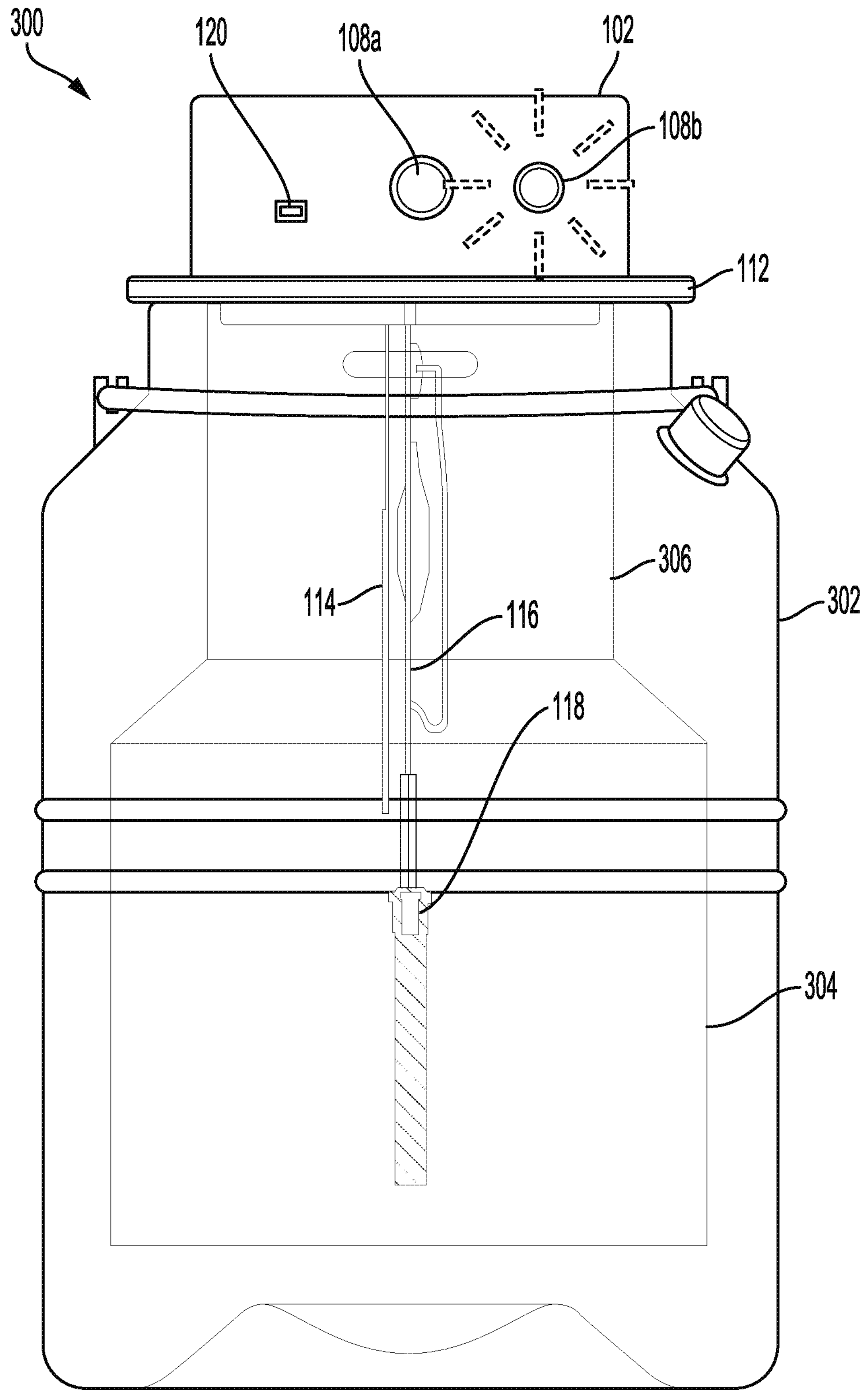
FIG. 3A shows a dewar drying system with the dewar drying apparatus of FIG. 1 according to an aspect of the invention.
Figure 3B:
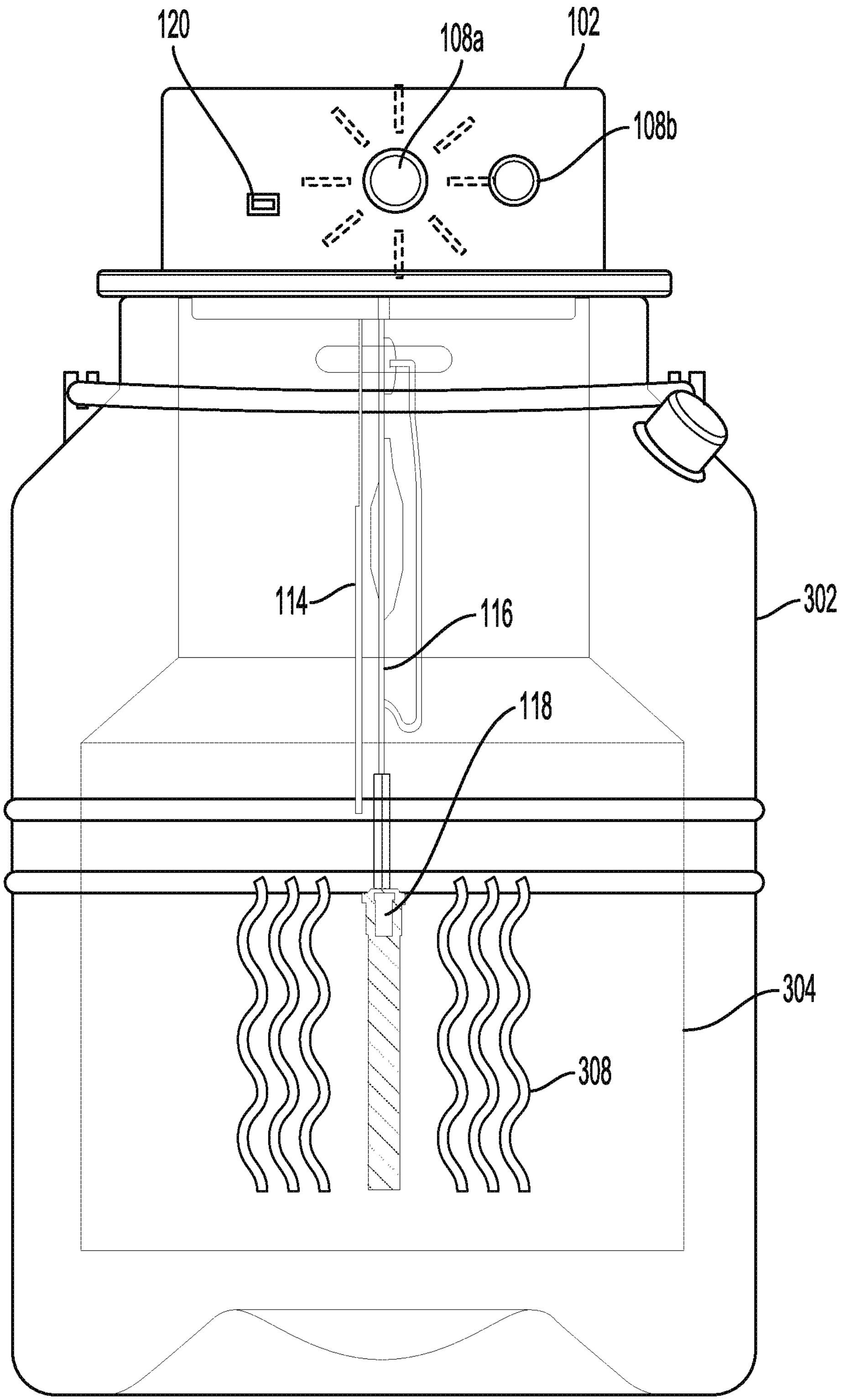
FIG. 3B shows the dewar drying apparatus of FIG. 1 heating the payload area of the dewar according to an aspect of the invention.

The drying apparatus 100 may include one or more indicators 108*a-b*. The one or more indicators 108*a-b* may indicate a status of the dry vapor shipper, such as the dewar 302 for example. For example, the indicator 108*b* may turn on to indicate when the heating element 118 is off or de-activated, as shown in FIG. 3A. The heating element 118 is off or de-activated when the drying apparatus 100 turns-off or disconnects the electrical energy so that no electrical energy is delivered to the heating element 118. In another example, the indicator 108*a* may turn on to indicate when the heating element 118 is on or activated, as shown in FIG. 3B. The heating element is on or activated when the drying apparatus 100 turns-on or connects the power source 110 with the heating element 118 to provide or deliver electrical energy to the heating element 118.

The drying apparatus 100 may use the one or more indicators 108*a-b* to indicate a status of the shipper, e.g., when the dewar 302 is dry. The drying apparatus 100 may blink, flash or otherwise use an on-off sequence to indicate the various states of the shipper or state of the drying apparatus 100. In some implementations, the drying apparatus 100 may use the user interface 122 to display the various states of the shipper and/or the drying apparatus 100. The indicating light may be a LED light which may be able to display different colors. The red colour may indicate that the drying apparatus 100 is in operation and is not safe to touch the heating element 118. A green light may be used to indicate the drying apparatus 100 has completed the process and the heating element 118 is safe to be handled.

The drying apparatus 100 may include a switch 120. The switch 120 may be an on-off switch that when in an on position allows power to turn-on the processing circuitry 103 and when in an off position cuts-off power to turn-off the processing circuitry 103. When the processing circuitry 103 is turned-on, the processing circuitry 103 may connect the power source 110, operate the one or more sensors 114 and/or operate the one or more indicators 108*a-b*. When the processing circuitry 403 is turned-off, the power source 110 may be disconnected, the one or more sensors 408 may be inactive, and/or the one or more indicators 108*a-b* may be de-activated.

The drying apparatus 100 may include a power source 110. The power source 110 may be an electrical socket or cable connected to an external power source, such as an electrical outlet, or may be a battery or other internal power source positioned within the housing 102 and/or coupled to the one or more drying platforms 101. The power source 110 delivers electrical energy to the heating element 118 to activate the heating element 118 and increase a temperature within the payload area of the shipper when the heating element 118 is positioned within. The power source 110 may deliver approximately 500 W of electrical energy for each of the one or more heating elements 118 that corresponds to the one or more drying platforms 101. The power source 110 for the one or more drying platforms 101 may be located in one control box that may contain an isolating switch that when turned off will disable all the heating elements 118. And when the power source 110 for the one or more drying platforms 101 are turned on, the power source 110 may power all of the one or more drying platforms 101. This will allow one power cable to be either connected directly to a power outlet or an alternate power source.

The drying apparatus 100 may include one or more drying platforms 101. The one or more drying platforms 101 may include a dewar cover 112, one or more sensors 114, a heating element 118, and one or more elongate members 116 in between the one or more sensors 114 or the heating element 118 and the dewar cover 112. The dewar cover 112 may be a circular, cylindrical, elliptical or otherwise polygonal-shaped planar surface with a circumference greater than an opening of the neck of the shipper to cover the opening of the neck of the shipper when placed over the opening. The dewar cover 112 may cover the opening to prevent foreign material from entering the payload area of the shipper when the drying platform 101 is inserted on top of the shipper, such as when the heating element 118 is positioned within the payload area to evaporate the LN2 or otherwise dry the shipper.

The one or more drying platforms 101 may include one or more sensors 114. The sensor 114 may be a humidity sensor. The humidity sensor may measure an amount of condensation within the payload area of the shipper. The sensor 114 may be a thermocouple. A thermocouple is an electrical device consisting of two dissimilar electrical conductors forming an electrical junction. A thermocouple produces a temperature-dependent voltage because of the thermoelectric effect that may be interpreted to measure temperature. The one or more sensors 114 may include various other sensors, such as a scale, which may measure differences in the weight of the shipper when the shipper has liquid or gaseous content within and when the shipper is dry, or an LN2 sensor, which may measure an amount of LN2 within the payload area of the shipper. The other sensors may include a sensor that recognizes when the heating element 118 is safe to emit heat based on one or more parameters, such as electrical contact, capacitance or an amount of light surrounding the heating element 118. The sensor may provide an indication using the user interface 122 to indicate whether it is safe to remove the heating element 118 and/or to use and power the heating element 118, such as the one or more indicators, which may be an audio indicator or a visual indicator. For example, the drying apparatus 100 may emit a sound alerting the user when the sensor indicate that it is unsafe to remove the heating element 118, such as when power is being supplied to the heating element 118.

The one or more drying platforms 101 may include a heating element 118. The heating element 118 converts electrical energy into heat, such as through the process of Joule heating. For example, electrical current may be delivered through the heating element to encounter resistance, which results in the heating of the heating element 118 to increase the temperature within the payload area 304 of the dewar 302, as shown in FIGS. 3A and 3B.

FIGS. 3A and 3B show the positioning of the various components of the drying apparatus 100 within the dewar drying system 300, which includes a dewar 302 and the drying apparatus 100 positioned within the dewar 302. The dewar 302 remains upright while the drying apparatus 100 evaporates any liquid or gaseous content within the dewar 302. This prevents ambient air that has water vapor or other moisture, such as condensation, from entering the dewar 302 and causing expansion of the voids and/or capillaries of the absorbent material. This allows the absorbent material to maintain its capability to store or hold LN2 and cryogenically cool the environment within the payload area 304 of the dewar 302.

Moreover, when the dewar 302 is upright, the dewar 302 is more stable during the evaporation process, takes up less space within the drying area and prevents the vapor plug lid from being damaged. Since the dewar 302 is more stable and takes up less storage area, the likelihood that the dewar 302 may tilt or otherwise tip over is decreased and the number of dewars that may be simultaneously stored for drying in the storage area is increased.

The dewar 302 or other dry vapor shipper may be a double-walled flask that has an inner wall and an outer wall. The dewar 302 may create a vacuum in between the inner and outer wall, which allows the space in between to be completely evacuated to insulate the materials stored. The dewar 302 may have an opening with a neck 306, which leads to a payload area 304 formed from the inner wall and that may store, hold or otherwise contain frozen biological materials, liquid and/or gases within and store the material at cryogenic temperatures.

When the heating element 118 is positioned within the payload area 304 of the dewar 302 and electrical energy is delivered to the heating element 118, the heating element 118 emanates heat or warmth 308 within the payload area 304 of the dewar 302, as shown in FIG. 3B for example. This increases the temperature within the payload area 304 of the dewar 302 and evaporates any remaining liquid or gas within the payload area 304 of the dewar 302. When no electrical energy is delivered to the heating element 118, the ambient temperature within the payload area 304 may gradually cool and decrease.

The one or more drying platforms 101 may include one or more elongate members 116. An elongate member 116 may be a hollow elongated tubular structure or pipe that has a proximal end and a distal end opposite the proximal end. The proximal end may be coupled or connected to the dewar cover 112, and the distal end may be coupled or connected to the one or more sensors 114 and/or the heating element 118. The one or more elongate members 116 allow the one or more sensors 114 and/or the heating element 118 to be inserted into the payload area 304 of the dewar 302 when the dewar cover 112 is positioned on top of the opening of the neck 306 of the dewar 302. The elongate member 116 that is coupled to the one or more sensors 114 may be positioned a distance apart from another elongate member 116 that is coupled to the heating element 118 so that the one or more sensors 114 measure sensor data of the environment within the payload area 304 and not the emanation of heat from the heating element 118.

The one or more elongate members 116 may extend from a center area of the dewar cover 112 so that the one or more sensors 114 and/or the heating element 118 is positioned centrally within the payload area 304 of the dewar 302, which allows for uniform temperature measurements and/or heating of the interior environment of the payload area 304 of the dewar 302.

The one or more drying platforms 101 may include a shroud 128. The shroud 128 may enclose or circumferentially surround the one or more elongate members 116, the one or more sensors 114 and/or the heating element 118. The shroud 128 may enclose or surround the elongate members 116, the one or more sensors 114 and/or the heating element 118 to protect the components from contacting a wall of the payload area 304 of the dewar 302 and prevent damage to the components. The shroud 128 may extend an entire length of the elongate members 116 and beyond the distal end of the one or more elongate members 116 to enclose or surround the one or more sensors 114 and/or the heating element 118. The shroud 128 may be perforated so as not interfere with the measurements of the sensor data and/or the heating of the environment within the payload area 304. In some implementations, the shroud may be in the form of a heat sink, e.g., aluminum fins that are positioned around the heating element 118, that extends the length of the heating element 118 or the shroud 128 may be around the entire drying apparatus 100 and act as a safety device that prevents a user from touching the heating element 118.

Figure 2:
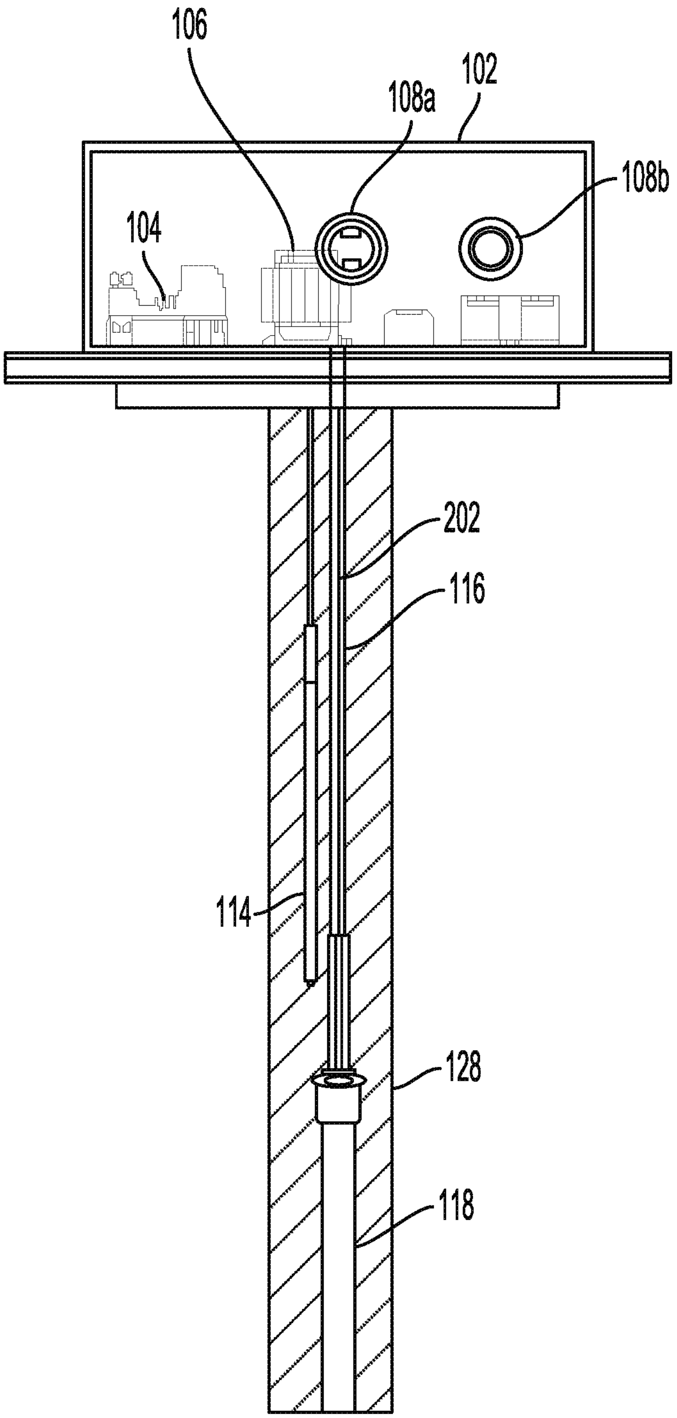
FIG. 2 shows an example a schematic diagram of the drying apparatus of FIG. 1A according to an aspect of the invention.
Figure 4:
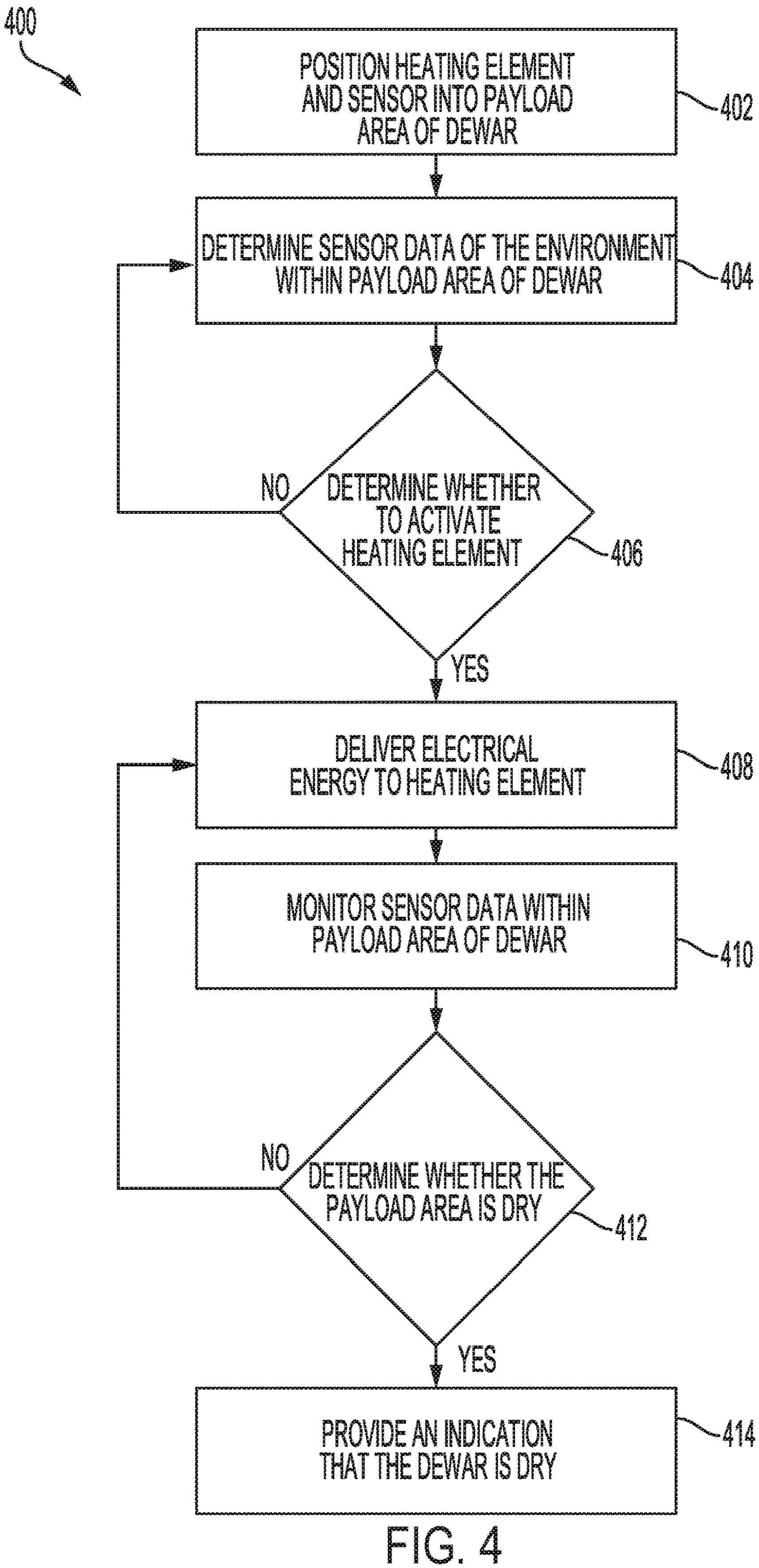
FIG. 4 is a flow diagram of an example process for drying the dewar using the dewar drying apparatus of FIG. 1 according to an aspect of the invention.

FIG. 2 shows a schematic diagram 200 of the drying apparatus 100. The schematic diagram 200 shows a cross-sectional view of the drying apparatus 100. The schematic diagram 200 shows the processing circuitry 103 within the housing 102 and one or more wires 202 that connect processing circuitry 103 to the heating element 118. The one or more wires 202 deliver electrical energy from the power source 110 to the heating element 118 to emit heat within the interior of the payload area 304 of the dewar 302. The processing circuitry 103 may be housed in one control box and another separate control box may be used as a junction box to house the one or more wires 202 and/or other connectors FIG. 4 is a flow diagram of a process 400 for evaporating any liquid or gas, such as LN2, within the payload area 304 of the dewar 302. One or more computers or one or more data processing apparatuses, for example, the processing circuitry 103 of the drying apparatus 100 of FIG. 1, appropriately programmed, may implement the process 400.

A user, technician, or other operator may position the drying apparatus 100 onto the shipper, such as the dewar 302, and within the payload area 304 of the dewar 302 (402). The user, technician, or other operator may insert the heating element 118 into the dewar 302 and position the dewar cover 112 to cover the opening of the neck 306 of the dewar 302.

Once the drying apparatus 100 is positioned on the dewar 302, the drying apparatus 100 may measure, determine or otherwise obtain sensor data of the environment within the payload area 304 of the dewar 302 (404). The sensor data may include a temperature within the payload area 304 of the dewar 302 and/or an amount of humidity or condensation within the payload area 304 of the dewar 302. The sensor data may include other measured parameters, such as the weight of the dewar 302 or the amount of LN2 within the payload area 304 of the dewar 302.

The drying apparatus 100 may use one or more sensors 114, such as a thermocouple or a humidity sensor, to obtain the sensor data. For example, the drying apparatus 100 may use the thermocouple to measure or determine the temperature within the payload area 304 or use the humidity sensor to measure or determine the amount of humidity or the amount of condensation within the payload area 304.

The one or more sensors 114 may be positioned at and coupled to a distal end of the elongate member 116 and opposite the dewar cover 112, which may be positioned at and coupled to a proximal end of the elongate member 116. The temperature, the amount of humidity or condensation or other measured parameter, such as the weight of the dewar 302 or the amount of LN2 within the payload area 304, may be used to determined whether the payload area 304 of the dewar 302 is dry.

Figure 5:
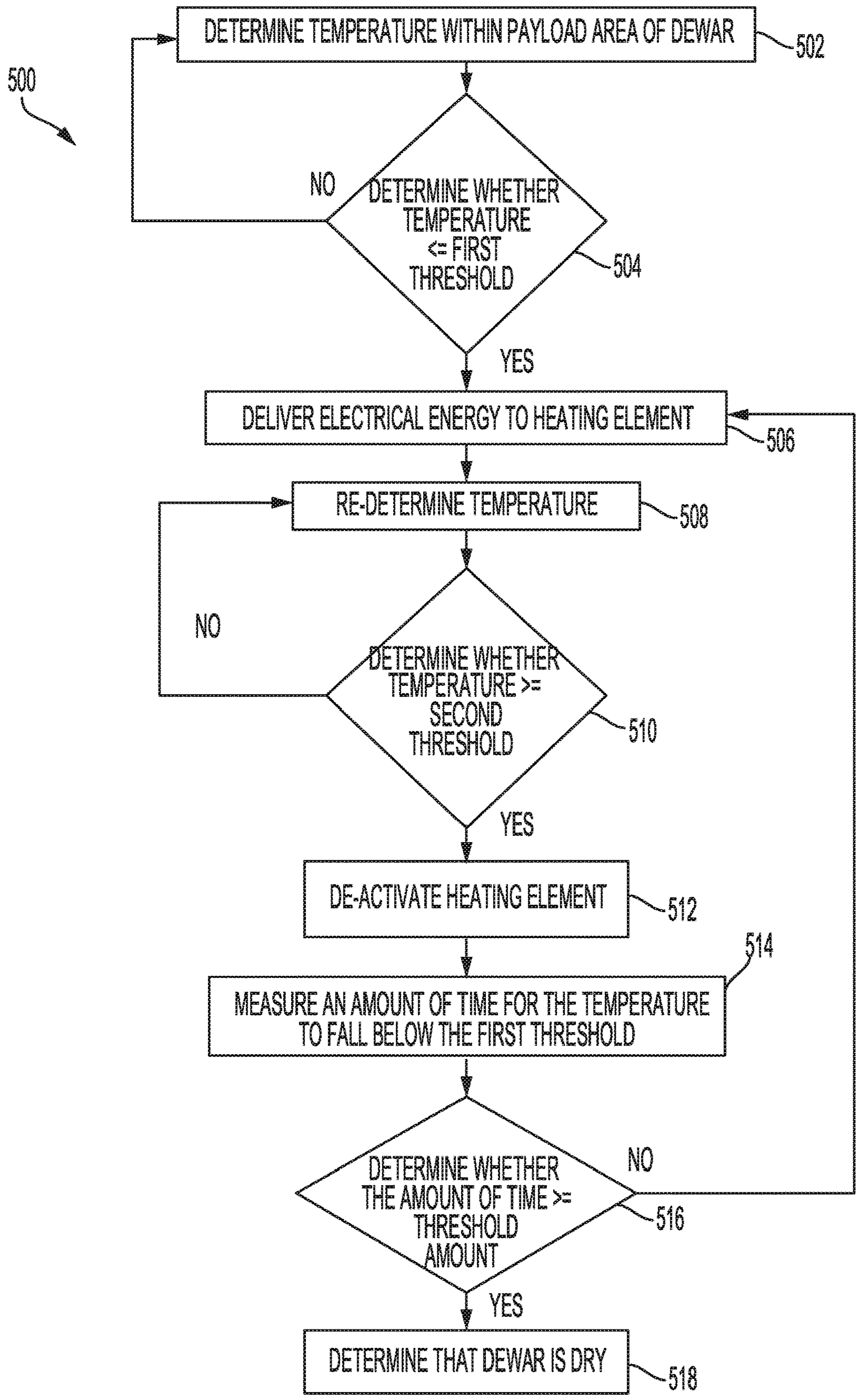
FIG. 5 is a flow diagram of an example process for determining whether the dewar is dry based on the temperature of the environment within the dewar using the dewar drying apparatus of FIG. 1 according to an aspect of the invention.

The drying apparatus 100 determines whether to activate the heating element 118 to increase the temperature within the payload area 304 of the dewar 302 (406). The drying apparatus 100 activates the heating element 118 to evaporate any liquid or gas within the payload area 304. The drying apparatus 100 may determine whether to activate the heating element 118 based on the sensor data. For example, when the sensor data indicates that the amount of humidity or the amount condensation or the amount of LN2 remaining in the payload area 304 is greater than a threshold amount, this may indicate that the payload area 304 has liquid or gaseous content within the payload area 304, such as LN2, which may need to be evaporated, and thus, the drying apparatus 100 may activate the heating element 118 to evaporate the liquid or gaseous content. In another example, when the sensor data indicates that the temperature within the payload area 304 is less than or equal to a threshold temperature, this may also indicate that the payload area 304 has liquid or gaseous content within the payload area 304, such as LN2, which may need to be evaporated. FIG. 5 further describes the process 500 of delivering electrical energy to the heating element 118 based on the temperature within the payload area 304 of the dewar 302. In another example, when the weight of the dewar 302 is greater than a baseline weight, this may indicate that there is liquid or gas within the payload area 304 and that the dewar 302 is not dry.

When the drying apparatus 100 determines that the heating element 118 should not be activated, the drying apparatus may continue to monitor or determine the sensor data, as described above (404). Otherwise, once the drying apparatus 100 determines that the heating element 118 should be activated, the drying apparatus 100 delivers the electrical energy to the heating element 118 (408). The one or more user interfaces 122 may display the temperature and humidity in the payload area. From the one or more user interfaces, a program may be selected as the drying cycle based on the information gathered from the sensor data. This program may be pre-programed into the drying apparatus 100 and listed as a function of the drying cycle.

The drying apparatus 100 uses the power source 110 to provide and apply the electrical energy to the heating element 118 through one or more wires 202 within the one or more elongate members 116. The drying apparatus 100 may turn-on, activate or otherwise allow the electrical energy from the power source 110 to be delivered to the heating element 118 via the one or more wires 202. By delivering electrical energy to the heating element 118, the heating element 118 emanates heat 308 into the payload area 304 of the dewar 302, as shown in FIG. 3B for example. And thus, the drying apparatus 100 warms or heats the environment within the payload area 304 and increases the temperature of the environment within the payload area 304.

While the heating element 118 heats the environment within the payload area 304, the drying apparatus 100 continues to monitor the sensor data (410). The drying apparatus 100 re-determines, re-detects and/or otherwise re-obtains the sensor data using the one or more sensors 114. The drying apparatus 100 may continually or periodically sample the sensor data and/or calculate an average or otherwise process the samples of the sensor data to determine whether the liquid or gas within the payload area 304 has evaporated and the dewar 302 is dry.

The drying apparatus 100 determines whether the payload area 304 is dry and/or that the liquid or gas within the payload area 304 has evaporated (412). The drying apparatus 100 may use the sensor data to determine whether the payload area 304 is dry and/or that the liquid or gas within the payload area 304 has evaporated. For example, the drying apparatus 100 may use the temperature, the amount of humidity, the amount of condensation, the weight and/or a combination thereof to determine that the payload area 304 is dry and/or that the liquid or gas within the payload area 304 has evaporated. The drying apparatus 100 may compare the sensor data to one or more thresholds to determine whether the payload area 304 is dry. For example, when the sensor data indicates that amount of humidity or the amount of condensation within the payload area 304 is greater than a threshold amount, this may indicate that the payload area 304 is not dry. In another example, the drying apparatus 100 may use the temperature to determine whether the payload area 304 is dry. FIG. 5 further describes one implementation of determining whether the liquid or gas within the payload area 304 has evaporated and the dewar 302 is dry using the temperature.

When the drying apparatus 100 determines that the payload area 304 is not dry and that there is liquid or gas still within the payload area 304, the drying apparatus 100 may re-deliver the electrical energy to the heating element 118 to continue to evaporate the liquid or gas, as described above (408). When the drying apparatus 100 determines that the payload area 304 is dry and that the liquid or gas has evaporated, the drying apparatus 100 may provide an indication to a user that the dewar 302 is dry (414).

The drying apparatus 100 may activate one or more indicators 108*a-b* to indicate the status of the dewar 302. For example, one indicator 108*a* may be used to indicate that the heating element 118 is off and that the dewar 302 is dry, and another indicator 108*b* may be used to indicate that the heating element 118 remains on and that the dewar 302 is not dry. The one or more indicator 108*a-b* may have assorted colors, such as green and/or red, or flash, blink or otherwise change states to indicate the state of the dewar 302 and/or the state of the heating element 118.

In some implementations, the drying apparatus 100 may provide the indication through a remote computer, such as on a user interface 122. The indication may include other information regarding the status of the heating element 118 and/or the state of the environment within the payload area 304 of the dewar 302. The other information may include an amount or a rate of evaporation, a current or average temperature, and/or the amount of liquid or gas remaining within the payload area 304 of the dewar 302.

FIG. 5 is a flow diagram of a process 500 for determining whether the liquid or gas within the payload area has evaporated and the dewar is dry using temperature data. One or more computers or one or more data processing apparatuses, for example, the processing circuitry 103 of the drying apparatus 100 of FIG. 1, appropriately programmed, may implement the process 500.

The drying apparatus 100 may determine the temperature within the payload area 304 of the dewar 302, as described above (502). The temperature may be averaged over time or may be an instantaneous temperature. The drying apparatus 100 may use the temperature to determine whether the payload area 304 is dry.

The drying apparatus determines whether the temperature is less than or equal to a first threshold (504). The first threshold may be a minimum temperature, such as approximately 70° C.-75° C., which may be representative of a temperature which indicates to the drying apparatus 100 to activate the heating element 118 to warm or heat the payload area 304 and evaporate or continue to evaporate any liquid or gas within the payload area 304. The first threshold may be a temperature that indicates that the heat within the payload area 304 is not as effective or no longer effective in furthering the evaporation of any liquid or gas within the dewar 302.

In some implementations, the first threshold may be user-configured, pre-configured or determined and/or a default temperature that is either set by a user or operator or set at the factor during manufacturing or distribution. The first threshold may be obtained from the memory 106 and may be different for various types, kinds or sizes of dewars. By being adjustable, the first threshold allows for the drying apparatus 100 to be used to dry various types, kinds or sizes of dewars.

When the drying apparatus 100 determines that the temperature is greater than the first threshold, this may indicate that the heat within the payload area 304 has not dissipated and may be continuing to warm the temperature and evaporate the liquid or gas within the payload area 304. The drying apparatus 100 may continue to determine and monitor the temperature within the payload area 304 of the dewar 302 when temperature is greater than the first threshold (502). When the drying apparatus 100 determines that the temperature is less than or equal to the first threshold, this may indicate that heat within the payload area 304 has dissipated. The drying apparatus would need to activate or re-activate the heating element 118 to further evaporate the liquid or gas within the payload area 304. Thus, the drying apparatus 100 delivers electrical energy to the heating element 118 to activate the heating element 118, warm the temperature within the payload area 304 of the dewar 302 and evaporate any liquid or gas within the payload area 304 of the dewar 302.

When the drying apparatus 100 determines that the temperature is less than or equal to the first threshold, the drying apparatus 100 may deliver the electrical energy to the heating element 118 to heat, re-heat or otherwise increase the temperature within the payload area 304 of the dewar 302 (506). The power source 110 delivers the electrical energy through the one or more wires 202 within the one or more elongate members 116 to the heating element 118. Once powered, the heating element 118 warms or heats the payload area 304 of the dewar 302. This increases the temperature within the payload area 304, which evaporates the remaining liquid or gas within the payload area 304.

While the heating element 118 warms the temperature within the payload area 304, the drying apparatus 100 continues to monitor, determine or otherwise detect the temperature within the payload area (508). The drying apparatus 100 uses the temperature sensor to continue to monitor the temperature so that the heating element 118 does not overheat the environment within the payload area 304 and/or damage the dewar 302. This prevents the drying apparatus 100 from damaging the dewar 302.

The drying apparatus 100 determines whether the temperature is greater than or equal to a second threshold (510). The drying apparatus 100 compares the temperature with the second threshold. The second threshold may be a threshold temperature that is representative of the maximum temperature limit of the dewar 302. The maximum temperature limit of the dewar 302 before damage occurs to the dewar 302 may be approximately 80° C.-100° C. The second threshold is greater than the first threshold. If the temperature within the payload area 304 were to exceed the second threshold, the dewar 302 may be damaged, and as such, the drying apparatus 100 may ensure that the temperature within the payload area 304 remains below the second threshold. The temperatures for both thresholds may be selected from the one or more user interfaces 122. These temperatures may also be preprogramed in each recipe selected from the one or more user interfaces 122.

When the temperature is less than the second threshold, the drying apparatus 100 may continue to deliver electrical energy to the heating element 118, as described above (506). The drying apparatus 100 continues to deliver the electrical energy to warm and/or increase the temperature within the payload area 304 to evaporate any liquid or gas within the payload area 304. Otherwise when the temperature is greater than or equal to the second threshold, the drying apparatus 100 de-activates the heating element 118 (512). The drying apparatus 100 de-activates the heating element 118 to prevent the temperature from increasing beyond the second threshold and damaging the dewar 302.

The drying apparatus 100 may turn-off or disconnect the power source 110 to prevent electrical energy from being delivered to the heating element 118 via the one or more wires 202. When electrical energy is not being delivered, the heating element 118 does not emanate or emit heat to warm the environment within the payload area 304. This causes the temperature within payload area 304 to decrease, which may be due to remaining liquid or gas within the dewar 302.

While the temperature cools within the payload area 304, the drying apparatus 100 continues to measure the temperature of the environment within the payload area 304. The drying apparatus 100 may use a timer, a clock or other device to measure an amount of time for the temperature to cool, decrease or otherwise fall below the first threshold (514). When the temperature cools, decreases or otherwise falls below the first threshold, the drying apparatus 100 may re-activate the heating element 118 to warm, heat or otherwise increase the temperature within payload area 304.

The drying apparatus 100 may use the measured amount of time to estimate an amount of any liquid or gas that remains within the payload area 304. The more amount of liquid or gas remaining the faster that the temperature within the payload area 304 will decrease. As the amount of liquid or gas remaining is reduced, the amount of time that it takes for the temperature within the payload area 304 to decrease to the first threshold from the second threshold increases because portions of the liquid or gas, such as the LN2, have evaporated.

The drying apparatus 100 determines whether the amount of time is greater than or equal to a threshold amount (516). The threshold amount may indicate a time equivalent to when the temperature would drop to the first threshold without the assistance of any liquid or gas within the payload area 304 to decrease the temperature. As such, this would indicate that there is no liquid or gas within the payload area 304 to assist in cooling the environment in the payload area 304.

When the amount of time is less than the threshold amount, this may indicate that there is liquid or gas still within the payload area 304, and as such, the drying apparatus may re-deliver electrical energy to the heating element 118 to re-heat, re-warm or otherwise increase the temperature within environment of the payload area 304, as described above (506). Otherwise, when the amount of time is greater than or equal to the threshold amount, this may indicate that there is no remaining liquid or gas to assist in reducing the temperature in the environment of the payload area 304, and as such, the dewar 302 may be dry. As such, the drying apparatus 100 may determine that the dewar 302 is dry and indicate to a user that the drying apparatus 100 is dry, as described above (518).

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A dewar drying apparatus for a dewar, comprising:

a housing resting entirely on top of a dewar cover;

the dewar cover positioned at a bottom of the housing and supporting the entire housing, the dewar cover also being removably positioned on top of an opening of a neck of the dewar and completely covering the opening, wherein the dewar cover is larger than the opening in two or more directions, so that the dewar cover rests against and so that both the dewar cover and the housing resting entirely on top of the dewar cover are supported solely by the neck of the dewar when the dewar cover is positioned on top of the opening;

a first elongate member attached to the bottom of the dewar cover and extending cantilevered from the bottom of the dewar cover and having a proximal end attached to the bottom of the dewar cover and a distal end away from the dewar cover;

a second elongate member attached to the bottom of the dewar cover and spaced away from the first elongate member, the second elongate member extending cantilevered from the bottom of the dewar cover and having a proximal end attached to the bottom of the dewar cover and a distal end away from the dewar cover and also spaced apart from the distal end of the first elongate member, wherein both the first elongate member and the second elongate member extend through the opening of the neck of the dewar and entirely through the neck of the dewar into a payload area of the dewar at an opposite side of the neck relative to the opening, a heating element disposed at the distal end of the first elongate member and inside the payload area of the dewar;

a sensor disposed at the distal end of the second elongate member and inside the payload area of the dewar and spaced apart from the heating element, wherein the sensor is nearer to the dewar cover than is the heating element, wherein the heating element and the sensor are both removably insertable into the payload area within the dewar through the opening of the neck of the dewar by removably resting the dewar cover on top of the neck, wherein the heating element is configured to produce heat that warms the payload area within the dewar; and a controller inside the housing and coupled to the heating element and configured to:

determine or detect, using the sensor, a temperature within the payload area of the dewar, and control, using the heating element, the temperature within the payload area of the dewar to evaporate a liquid or a gas within the payload area.

2. The dewar drying apparatus of claim 1, wherein to control the temperature within the payload area of the dewar the controller is configured to:

activate the heating element; and increase, using the heating element, the temperature within the payload area of the dewar to evaporate the liquid or the gas when the temperature is below a first threshold temperature.

3. The dewar drying apparatus of claim 2, wherein the controller is configured to deactivate the heating element when the temperature within the payload area of the dewar is greater than or equal to a second threshold temperature.

4. The dewar drying apparatus of claim 3, wherein the second threshold temperature is greater than the first threshold temperature.

5. The dewar drying apparatus of claim 4, wherein the controller is configured to:

deactivate the heating element;

after the deactivating, then measure an amount of time for the temperature to decrease from the second threshold temperature to the first threshold temperature; and determine that the payload area within the dewar is dry when the amount of time is greater than a threshold amount of time, the threshold amount of time corresponding to a duration associated with there being a presence of remaining cryogen that is cooling the payload area during the duration.

6. The dewar drying apparatus of claim 1, wherein the housing that encloses the controller also has an indicator configured to visually indicate when the payload area within the dewar is dry, wherein the controller is configured to:

activate the indicator to visually indicate that the payload area is dry.

7. The dewar drying apparatus of claim 1 wherein the first elongate member is an elongate member that has a hollow tubular structure that surrounds one or more wires that deliver electrical energy from a power source to the heating element, wherein the distal end of the elongate member is positioned within the payload area of the dewar so that the heating element extends into the payload area.

8. The dewar drying apparatus of claim 1, wherein the sensor comprises a thermocouple device configured to measure the temperature within the payload area of the dewar, wherein the controller is coupled to the thermocouple device and configured to:

determine or detect the temperature within the payload area of the dewar using the thermocouple device.

9. A dewar drying system, comprising:

a first dewar having a first payload area;

a second dewar having a second payload area;

a first dewar drying device comprising a first dewar cover completely covering and sitting on top of a first opening of a first neck of the first dewar so that the first dewar cover is supported by the first neck of the first dewar when the first dewar cover is positioned on top of the first opening, the first dewar drying device further comprising a first heating element connected to the first dewar cover by a first elongate tube extending cantilevered from the first dewar cover and having a proximal end attached to the first dewar cover and a distal end away from the first dewar cover and supporting the first heating element on the first dewar cover, the first heating element disposed at the distal end of the first elongate tube and configured to be inserted into the first dewar and produce heat that warms the first payload area of the first dewar, wherein the first dewar drying device further comprises a first sensor connected to the first dewar cover by a second elongate tube extending cantilevered from the first dewar cover and having a proximal end attached to the first dewar cover and a distal end away from the first dewar cover and supporting the first sensor on the first dewar cover, the first sensor disposed at the distal end of the second elongate tube and configured to be inserted into the first dewar, wherein the first sensor and the first heating element are spaced apart inside the first dewar by the first and second elongate tubes, and also wherein the first sensor is between the first dewar cover and the first heating element;

a second dewar drying device comprising a second dewar cover completely covering and sitting on top of a second opening of a second neck of the second dewar so that the second dewar cover is supported by the second neck of the second dewar when the second dewar cover is positioned on top of the second opening, the second dewar drying device further comprising a second heating element connected to the second dewar cover by a third elongate tube extending cantilevered from the second dewar cover and having a proximal end attached to the second dewar cover and a distal end away from the second dewar cover and supporting the second heating element on the second dewar cover, the second heating element disposed at the distal end of the third elongate tube and configured to be inserted into the second dewar and produce heat that warms the second payload area of the second dewar, wherein the second dewar drying device further comprises a second sensor connected to the second dewar cover by a fourth elongate tube extending cantilevered from the second dewar cover and having a proximal end attached to the second dewar cover and a distal end away from the second dewar cover and supporting the second sensor on the second dewar cover, the second sensor disposed at the distal end of the fourth elongate tube and configured to be inserted into the second dewar, wherein the second sensor and the second heating element are spaced apart inside the second dewar by the third and fourth elongate tubes and also wherein the second sensor is between the second dewar cover and the second heating element; and a controller coupled to the first dewar drying device and the second dewar drying device, and configured to:

control, using the first heating element, a first temperature within the first payload area, measure an amount of time for the first temperature to decrease from an initial threshold to a subsequent threshold, determine, using the first sensor, that the first payload area is dry when the amount of time is greater than a threshold amount of time, and control, using, the second heating element, a second temperature within the second payload area.

10. The dewar drying system of claim 9, further comprising:

a power source configured to deliver electrical energy to the first heating element and the second heating element, wherein the controller is configured to control, using the first heating element, the first temperature and control, using the second heating element, the second temperature independently.

11. The dewar drying system of claim 10, wherein to control the first temperature and control the second temperature, the controller is configured to:

deliver a first amount of the electrical energy to the first heating element to increase the first temperature; and deliver a second amount of the electrical energy to the second heating element to increase the second temperature.

12. The dewar drying system of claim 11, wherein the first amount is different from the second amount or the first amount is delivered before or after the second amount is delivered.

13. The dewar drying system of claim 9, further comprising:

a first indicator configured to visually indicate when the first payload area within the first dewar is dry; and a second indicator configured to visually indicate when the second payload area within the second dewar is dry.

14. The dewar drying system of claim 9, wherein the first dewar and the second dewar remain upright when the first dewar drying device evaporates a liquid or gas within the first dewar and the second dewar drying device evaporates a liquid or gas within the second dewar.

15. A dewar drying apparatus for a dewar, comprising:

a dewar cover comprising a disk-shaped member with a first circumference;

a housing disposed entirely within the first circumference and attached to an upper side of the disk-shaped member;

a first rod attached to a lower side of the disk-shaped member and extending away from the lower side of the disk-shaped member;

a second rod attached to the lower side of the disk-shaped member and spaced apart from the first rod, wherein the first rod and the second rod extend in a parallel orientation, wherein the first rod is longer than the second rod, a heating element attached to a distal-most end of the first rod, a sensor attached to the second rod, wherein the sensor is nearer to the disk-shaped member than is the heating element;

a dewar having a neck with an opening, and a payload area connected to the neck opposite the opening;

wherein the dewar cover rests entirely supported on only the neck and the first rod and the second rod extend into the opening and through the neck and into the payload area, wherein both the sensor and the heating element are disposed in spaced apart relation inside the payload area and not contacting any portion of the dewar, but are supported only by the second rod and the first rod respectively;

a controller inside the housing and coupled to the heating element and configured to:

determine or detect, using the sensor, a temperature within the payload area of the dewar, and control, using the heating element, the temperature within the payload area of the dewar to evaporate a liquid or a gas within the payload area.

* * * * *